Oct. 4, 1960   R. R. DE MARTIN   2,954,762
TWO CYCLE GAS ENGINE
Filed Dec. 30, 1958   2 Sheets-Sheet 1
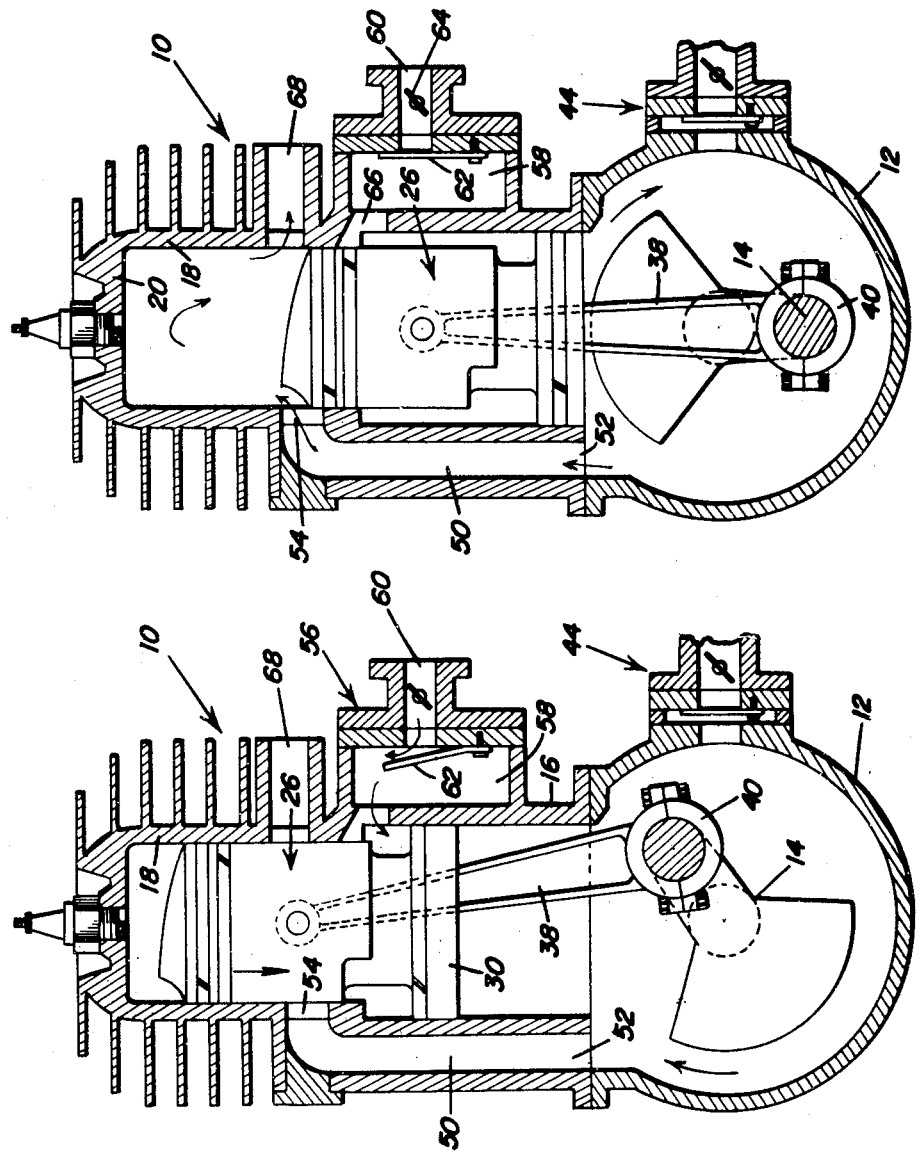
Roger R. DeMartin
INVENTOR.

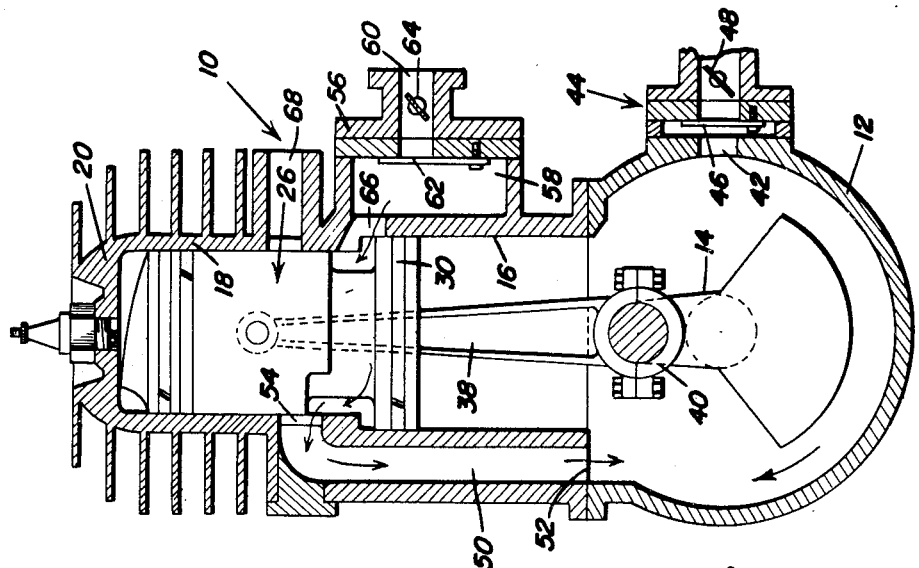
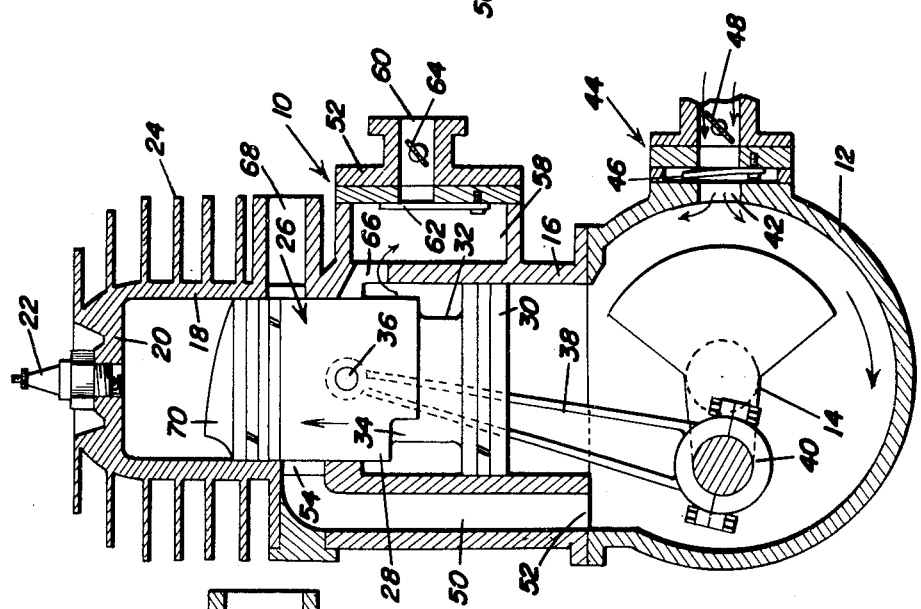
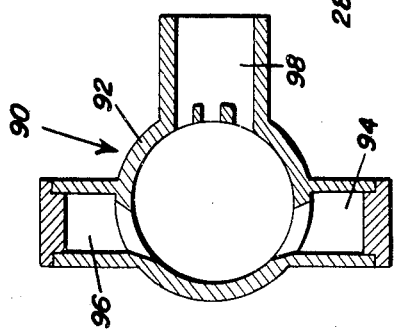
Roger R. DeMartin
INVENTOR.

_United States Patent Office_

2,954,762
Patented Oct. 4, 1960

2,954,762
TWO CYCLE GAS ENGINE
Roger R. De Martin, 3249 Academy Drive, Windsor, Ontario, Canada
Filed Dec. 30, 1958, Ser. No. 783,751
5 Claims. (Cl. 123—71)

This invention relates in general to new and useful improvements in internal combustion engines, and more specifically to engines of the two cycle rear compression scavenging type.

This application is an improvement upon my copending application Serial No. 687,464, filed October 1, 1957.

In my above mentioned prior engine construction it was necessary that the air be compressed within the compressor chamber. Inasmuch as the compressed air was then admitted to the bypass passage and finally admitted into the cylinder of the engine, the work required in compressing the air was lost. It is therefore the primary object of this invention to provide an internal combustion engine similar to that disclosed in my copending application Serial No. 687,464 and wherein the internal combustion engine is provided with a surge chamber whereby the incoming air may be maintained at a generally low pressure in order that the work required in forcing the air into the cylinder for scavenging purposes may be reduced to a minimum.

Another object of this invention is to provide an internal combustion engine of the two-cycle type wherein the fuel-air mixture is admitted into the crankcase of the internal combustion engine and then forced into the cylinder of the engine by means of a bypass passage, there being provided means for directly charging the bypass passage with pure air so that the gases first entering into the cylinder and used for scavenging purposes will be pure air in lieu of the usual fuel-air mixture so that the economy of the internal combustion engine is greatly increased.

Another object of this invention is to provide a two cycle internal combustion engine of the type wherein the fuel-air mixture is normally fed into the crankcase and delivered to the cylinder of the engine by means of a bypass passage, and means for scavenging the cylinder with fresh air only, the means including an extension on the piston of the internal combustion engine, which extension functions as a compressor and which draws in fresh air and forces such fresh air into the bypass passage so that the bypass passage is substantially filled with fresh air and such fresh air is used for scavenging purposes, there also being associated with the piston and the air intake a surge chamber whereby the necessary quantity of air may be provided at a relatively low pressure.

A further object of this invention is to provide an internal combustion engine of the two cycle type wherein a fuel-air mixture is fed into the crankcase of the internal combustion engine and then forced into the cylinder thereof through a bypass passage, there being provided means for admitting air to the bypass passage under pressure so that such air will be used for scavenging purposes, there being provided control means both on the fuel air mixture and the air whereby the richness of the fuel-air mixture may be varied as desired to obtain either the maximum power or maximum efficiency.

These together with other objects and advantages which will become subsequently apparent reside in the details of construction and operation as more fully hereinafter described and claimed, reference being had to the accompanying drawing forming a part hereof, wherein like numerals refer to like parts throughout, in which:

Figure 1 is a vertical sectional view through a typical internal combustion engine employing the principles of this invention and shows the piston moving downwardly on the power stroke with air being drawn into air compression chamber in the lower portion of the cylinder of the internal combustion engine by the lower portion of the piston;

Figure 2 is a vertical sectional view similar to Figure 1 and shows the piston at the lower end of its stroke with the cylinder being initially scavenged after which the fuel-air mixture from the crankcase will enter into the cylinder;

Figure 3 is a view similar to Figure 1 and shows the piston on its compression stroke with the air in the lower portion of the cylinder being compressed and forced into the surge chamber;

Figure 4 is a sectional view similar to Figure 1 and shows the piston as it reaches the upper end of its compression stroke at which time the surge chamber is communicated with the bypass passage so that the bypass passage is filled directly with fresh air; and Figure 5 is a transverse sectional view on a reduced scale taken through the cylinder of a modified form of internal combustion engine and shows the arrangement of a pair of bypass passages with respect to the exhaust passage of the engine.

Referring now to the drawings in detail, there is illustrated the internal combustion engine which is the subject of this invention, the engine being referred to in general by the reference numeral 10. It is to be understood that the internal combustion engine 10 may be of any desired construction, that is it may be cast or fabricated and the various components thereof may be disassembled as is necessary for repairs.

The internal combustion engine 10 includes a crankcase 12 in which there is rotatably journaled a crankshaft 14. Extending upwardly from the crankcase 12 is a lower cylinder portion 16 which terminates in an upper cylinder portion 18. It is to be noted that the lower cylinder portion 16 is of a greater diameter than the upper cylinder portion 18. The upper end of the upper cylinder portion 18 is closed by means of a head 20 which carries the necessary spark plug 22. Also, the upper cylinder portion 18 is provided with suitable cooling fins 24.

Mounted within the lower cylinder portion 16 and the upper cylinder portion 18 is a piston which is referred to in general by the reference numeral 26. The piston 26 includes an upper piston portion 28 and a lower piston portion 30, the piston portion 28 corresponding to the cylinder portion 18 and the piston portion 30 corresponding to the cylinder portion 16. Disposed intermediate the piston portions 28 and 30 is an annular recess 32 which terminates in an upwardly directed passage 34.

The piston 26 includes a piston pin 36 to which there is connected a piston rod 38. The piston rod 38 is in turn connected to the crankshaft as at 40 so that the reciprocatory movement of the piston 26 may be converted to rotary movement by the crankshaft 14.

The internal combustion engine 10 is of a nature whereby the crankcase 12 thereof is to be charged with a fuel air mixture. Accordingly, the crankcase 12 is provided with a fuel-air inlet passage 42. The passage 42 opens into a valve assembly which is referred to in general by the reference numeral 44. The valve assembly 44 includes a flapper valve 46 which is automatic in operation and a butterfly valve 48 which is manually controlled in order to control the speed of the internal combustion engine 10. The carburetor and other components of the fuel system of the internal combustion engine 10 have been omitted inasmuch as they will be conventional.

In order that the fuel-air mixture from within the crankcase 12 may be delivered into the upper portion of the cylinder 18 above the piston 26, there is provided a bypass passage 50. The bypass passage 50 opens into the upper part of the crankcase 12 as at 52 and into the lower part of the upper cylinder portion 18 as at 54.

Mounted on the lower cylinder portion 16 is a housing 56 which defines a surge chamber 58. The surge chamber 58 is provided with an air inlet passage 60. Associated with the air inlet passage 60 is a flapper valve 62 and a manually controlled butterfly valve 64.

The surge chamber 58 is communicated with the upper portion of the lower cylinder 16 by means of a passage 66. Thus under all conditions of operation the cylinder portion 16 is communicated with the surge chamber 58.

Disposed in diametrically opposite relation to the bypass passage outlet port 54 is an exhaust passage 68. The exhaust passage 68 is disposed slightly above the port 54 so that it will be first uncovered upon the downward travel of the piston 26. Incidentally, the piston 26 is of the type which includes a deflector head 70.

The sequence of operation of the internal combustion 10 is illustrated in Figures 1, 2, 3, and 4, consecutively. In Figure 1, the explosive charge within the upper cylinder portion 18 has been ignited and the piston 26 is moving downwardly upon its power stroke. As the head of the piston 26 moves downwardly and clears the exhaust passage 68, the exhaust gases within the upper cylinder portion 18 will begin flowing therethrough. However, as the piston 26 moves downwardly, the downward movement of the lower piston portion 30 within the lower cylinder portion 16 will result in a vacuum being formed both within the upper part of the lower cylinder portion 16 and within the surge chamber 58. The vacuum formed within the surge chamber 58 will result in the automatic opening of the flapper valve 62 in order that air may be drawn into the air intake passage 60.

After the exhaust passage 68 has been uncovered by the piston 26, see Figure 2, the intake passage 54 will next be uncovered. Inasmuch as the bypass passage 50 will be filled with fresh air, in a manner to be described in more detail hereinafter, that gas first entering into the upper cylinder portion 18 will be air alone and not a fuel-air mixture. The air will serve to scavenge the upper cylinder portion 18 and force the residual exhaust gases out through the exhaust passage 68. Finally the fuel-air mixture from within the crankcase will be forced up into the upper cylinder portion 18 by means of the pressure built up in the crankcase. The piston 26 has now completed its power stroke and is now ready to move upwardly upon its compression stroke.

Referring now to Figure 3, as the piston 26 moves upwardly on its compression stroke, a vacuum will be formed in the crankcase 12 below the piston portion 30 and a fuel-air mixture will be drawn thereinto after the flapper valve 46 has been moved to the open position. At the same time, the air within the lower cylinder portion 16 above the lower piston portion 30 will be pumped upwardly by the upward movement of the lower piston portion 30 into the surge chamber 58. Due to the size of the surge chamber 58, the air disposed therein will be only lightly compressed.

Referring now to Figure 4 in particular, it will be seen that the piston 26 has reached out-stroke position. At this time, the passage 34 is aligned with the passage 54 and the fresh air stored within the surge chamber 58 will flow through the passage 66, around the annular recess 32, out through the passage 34 and into the passage 54 so that it will fill the bypass passage 50. Also, the air may fill the upper part of the crankcase 12. It is to be understood that the volume of air will be controlled so that the necessary scavaging air will be provided for the scavenging operation illustrated in Figure 2.

By controlling the settings of the butterfly valves 48 and 64, the speed and power requirements of the internal combustion engine 10 may be controlled. If a relatively rich mixture is desired, the butterfly valve 64 may be closed while the butterfly valve 48 is open. On the other hand, if a leaner mixture is desired, the reverse setting of the butterfly valves 48 and 64 will be provided.

Inasmuch as the air which is forced into the bypass passage 50 is received from a very large chamber, the surge chamber 58, it will be seen that it is not necessary that the air be heavily compressed. It is only necessary that the air be under such a pressure whereby it will readily flow into the crankcase 12. Incidentally, the crankcase 12 will be at a pressure less than atmospheric pressure due to the partial vacuum formed therein by the upward movement of the piston 26 on its out-stroke. By reducing the pressures to which the air which is to be delivered to the bypass passage 50 must be raised through the use of the surge chamber 58, it will be readily apparent that very little work is required to provide the air which is urged for scavenging purposes. Thus the internal combustion engine 10 has a very high efficiency.

Referring now to Figure 5 in particular, it will be seen that there is illustrated an upper portion of the cylinder of a modified form of internal combustion engine, the internal combustion engine being referred to in general by the reference numeral 90 and the upper cylinder portion by the reference numeral 92. In lieu of the single bypass passage 50, there will be provided two bypass passages 94 and 96 which are disposed in generally diametrically opposite relation and which will open into the upper cylinder portion 92 at opposite sides thereof.

The upper cylinder portion 92 also includes an exhaust passage 98. The exhaust passage 98 is disposed remote from the bypass passages 94 and 96 and generally at right angles thereto. Thus the desired circulation of the air within the cylinder of the internal combustion engine 90 may be obtained to provide the desired scavaging action without requiring a piston having a deflector head.

From the foregoing, it will be readily apparent that there has been devised an improved internal combustion engine of the two cycle type wherein the normal loss of efficiency by using a fuel-air mixture for scavenging purposes is eliminated and by utilizing very little work on the part of the piston of the engine, the engine may be so constructed so that fresh air is used for scavenging purposes.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An internal combustion engine comprising a crankcase, a cylinder mounted on said crankcase, a piston mounted in said cylinder, said cylinder including a smaller diameter upper portion and a larger diameter lower portion, said piston including an upper portion seated in said cylinder upper portion and an enlarged lower portion seated in said cylinder lower portion, an annular recess in the exterior of said piston intermediate said piston upper portion and said piston lower portion, an air-fuel inlet in said crankcase, a bypass passage extending between and communicating said crankcase with the lower part of said cylinder upper portion, a surge chamber adjacent said cylinder lower portion, an air inlet in said surge chamber, and an air passage between said surge chamber and said cylinder lower portion, said bypass passage opening into said cylinder in vertically offset relation to said air passage whereby said bypass passage and said air passage may be separately uncovered.

2. The combination of claim 1 wherein said air-fuel inlet and said air inlet each has a non-return flapper type check valve.

3. The combination of claim 1 wherein said air-fuel inlet and said air inlet each has a non-return flapper type check valve and an adjustable flow control valve.

4. The combination of claim 1 including an exhaust port in said cylinder upper portion opposite the inlet of said by-pass passage, said piston having a deflector head for effecting circulation of gases at said cylinder upper portion.

5. The combination of claim 1 wherein there are a pair of by-pass passages communicating with the crankcase and entering said cylinder upper portion in diametrically opposite relation and an exhaust passage communicative with said cylinder upper portion at a position intermediate said by-pass passages.

References Cited in the file of this patent

UNITED STATES PATENTS

| | | |
|---|---|---|
| 1,121,584 | Harper | Dec. 15, 1914 |
| 2,119,121 | Steinlein | May 31, 1938 |
| 2,630,791 | Kiekhaefer | Mar. 10, 1953 |
| 2,865,349 | MacDonald | Dec. 23, 1958 |

FOREIGN PATENTS

| | | |
|---|---|---|
| 471,211 | Germany | Feb. 8, 1929 |